May 8, 1945.  C. M. SHIGLEY  2,375,499

ROTARY LIME TREATING APPARATUS

Filed Aug. 5, 1943

Inventor
C. M. Shigley
by William S. Gates
Attorney

Patented May 8, 1945

2,375,499

UNITED STATES PATENT OFFICE 2,375,499

ROTARY LIME TREATING APPARATUS

Claire M. Shigley, Freeport, Tex., assignor to The Dow Chemical Company, Midland, Mich., a corporation of Michigan Application August 5, 1943, Serial No. 497,531

8 Claims. (Cl. 23—287)

This invention relates to improvements in rotary material treating, decanting and classifying devices, particularly in the nature of slakers for lime and similar active materials.

It is well known in the prior art to treat materials such as quick lime with water to produce milk of lime by placing the materials, CaO and water, in a rotating drum and agitating them to bring about the desired contact and reaction and to convey the grit such as sand, stones and inactive matter away by various means such as screening, and flowing the milk of lime out of the drum relatively free of grit and coarse impurities.

It is an object of this invention to provide apparatus for achieving the greatest practicable extent of agitation of materials being treated, together with an efficient separation of grit from a liquid suspension of fine treated material.

Another object is the provision of classifying means for a continuous decantation of a liquid suspension of fine solids or dissolved matter from a mixture in a revolving drum intermediate the feed and discharge ends of the drum and adjacent the discharge end at which coarse particles will be continuously conveyed out of the drum above the level of the mixture within the drum.

Still another object is to provide apparatus of the type described in which a drum rotated on a substantially horizontal axis is provided with feed and coarse material discharge openings at its opposite ends arranged above the level of liquid mixture within the drum, and in which an annular decanting trough opening radially inward of the drum is supported within the shell intermediate its ends by hollow spokes opening inwardly into the trough and outwardly through the shell, the lips of the trough being radially outward of the feed and discharge openings to provide an outlet for the milk of lime or other liquid either clear or containing suspended fine solids.

Other and still further objects will appear from the following description.

In order that this invention may be clearly understood and readily carried into effect, the same is fully described below with reference to the accompanying drawing, in which.

Similar reference characters refer to similar parts throughout the several figures of the drawing.

Figure 1:
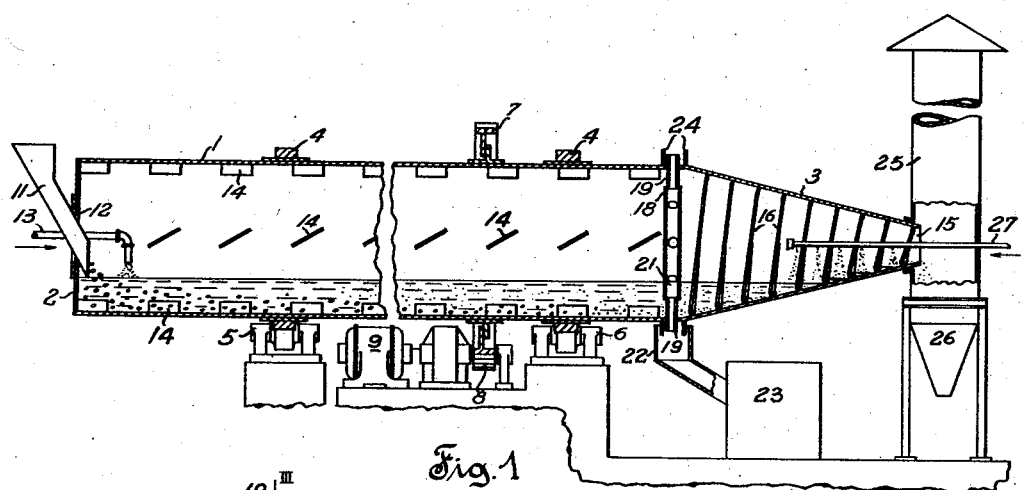
Fig. 1 is a vertical longitudinal section through a rotary apparatus according to the invention with a portion of the drum broken away to shorten the drawing.
Figure 2:
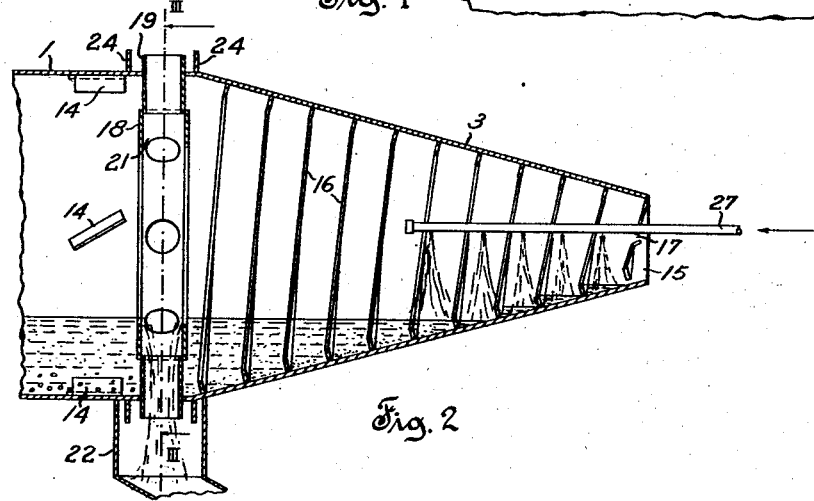
Fig. 2 is an enlarged view of the right end portion of Fig. 1.
Figure 3:
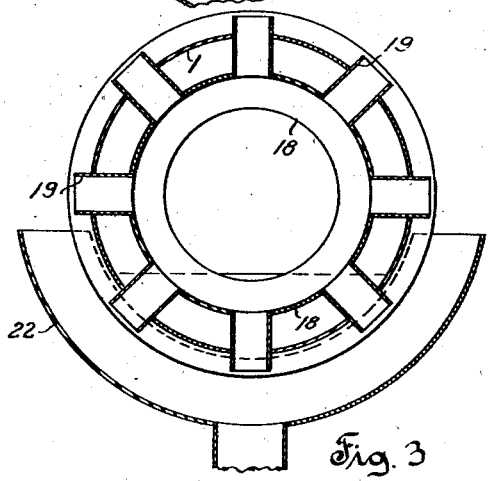
Fig. 3 is a cross-section taken on the line III—III of Fig. 2.

The embodiment of the invention as shown in the drawing may be a rotary lime slaker and classifier. The drum consists of a cylindrical shell 1 having an annular feed end wall 2 and a frusto-conical discharge end wall 3. The drum may be supported by riding rings 4 resting on rollers or other bearing means 5 and 6 of which 6 is a combination journal and thrust bearing. The bearings 5 and 6 are shown conventionally and may be of any known suitable type, as the invention is not concerned with the precise structure of the supports. The drum may be rotated about its longitudinal axis by a driving gear 7 with which is meshed a driving pinion 8 coupled to a motor or other rotary power supply 9. The drum may of course be driven by any other known means of power transmission, for instance a belt or other friction drive means (not shown). A feed spout 11 is arranged to convey lime or other material by gravity into the feed opening 12 and a water or other liquid supply pipe 13 is suitably arranged to introduce water, or other liquids, into the feed opening 12. The drum may be provided with a plurality of vanes or agitators 14 attached to its inner cylindrical surface and inclined relative to an element of said surface in a manner to agitate and convey coarse granular material in the direction of the grit discharge opening 15 upon rotation of the drum. The inner surface of frusto-conical wall 3 is equipped with a helical strip or spiral fin or fins 16 capable of elevating coarse granular material or grit and conveying the same out of the grit discharge opening 15 upon rotation of the drum. This fin 16 may be broken at the last few turns as shown at 17 in order to permit washing water or other liquid elevated above the general liquid level to flow back into the drum against the travel of coarse granular material or grit.

Intermediate the ends of the drum and adjacent the conical end wall 3, an annular decanting trough 18, concentric with the drum and substantially U-shaped in cross-section, is supported within the shell 1 by hollow spokes 19. The annular opening 21 of the U-shaped decanting trough is directed radially inward as shown in the drawing, and the diameter of annular opening 21 is sufficiently larger than openings 12 or 15 that with the drum in operative position the tangent to the annular opening 21 at the lowermost portion of the trough 18 is substantially below the horizontal planes tangent to openings 12 and 15 at their lowermost points. Hollow spokes 19 open at their radially inner ends through the outer wall of trough 18 and at their outer ends through the shell or drum 1 as shown, and are welded or otherwise rigidly secured to said shell and trough. A semi-annular launder 22 may be arranged as shown symmetrically to a vertical plane through the outer end openings of spokes 19 and radially spaced from the outside of the shell 1. The launder 22 may be connected to drain into a sump as shown at 23. Annular drip rings or flanges 24 on the shell 1 flank the outward openings of supports or spokes 19. The grit discharge opening 15 may be enclosed in a steam vent 25 and a hopper may be arranged as at 26 to catch grit or coarse rejected material conveyed out of the drum. A rinsing water spray pipe 27 may project into opening 15.

The words decant and decanting are used herein and in the claims to refer solely to an action in which liquid, or liquid having fine particles of solids suspended therein, is withdrawn, more or less gently, from a point at or near the surface of a body of liquid in a vessel, to separate the same from non-suspended solids, as over a liquid level determining edge or lip above the bottom of said vessel, in which said non-suspended solids are permitted to remain.

The operation of the device as a lime slaker is as follows. Suitable quantities of lime and water are continuously fed by spout 11 and water supply pipe 13 through the opening 12 and the drum is continuously rotated. Lime and water continue to enter and be churned around and agitated and conveyed by the scoop action of agitating blades or vanes 14 toward the discharge end of the shell 1. The level of the mixture rises until it reaches the lips or annular opening 21 of trough 18. The heat generated by the reaction will serve to keep the mixture heated to a degree sufficient to promote rapid slaking action. The liquid, bearing the fine particles of hydrated lime (milk of lime) will flow into the trough 18 and thence through the hollow spokes 19 into launder 22 and to sump 23 or other destination not shown. Coarse grit and unslakable particles not fine or light enough to be readily held in suspension in the flowing, agitated liquid will be conveyed by the vanes 14 and spiral fin 16 out of the liquid mixture, and being rinsed by the water spray from 27, if employed, will be discharged at 15 into the hopper 26 or other receptacle. Steam or vapor generated in the process of slaking may be vented through 25 at a safe point. Milk of lime tending to run along the drum surface from the outer openings of spokes 19 will be stopped by drip flanges 24 and will drip into launder 22. The length of the drum from the feed opening 12 to trough 18 must be traversed by the materials being treated, in intimate contact with the admixed water, and under constant and thorough agitation. The lime is thoroughly broken up and reacted upon by agitation with water to produce the familiar fine light powdered hydrate of lime which is readily carried in suspension in the agitated surplus liquid as milk of lime. Grit, solid impurities, and unslakable particles tend to settle toward the bottom where they are swept along toward the discharge by vanes 14, elevated out of the liquid mixture by the fin 16 and discharged at 15 relatively free of water and milk of lime which flow back down the frusto-conical wall 3 by means of openings 17 in the fin 16.

It will be understood that in addition to being useful for lime slaking or the production of milk of lime, this apparatus is clearly useful for the promotion of other reactions and the classifying of many comminuted and granular solids. The extended and intimate mixture, the conveying action and agitation readily promote chemical action and classification of solid materials by separation of coarse solids from other and finer solids which are more readily carried in suspension in the liquid. For an example of another use, quick lime or CaO may be mixed with both water and $Na_2CO_3$ and a reaction carried on the results of which will be $2NaOH+CaCO_3$, the NaOH being in solution in the excess water and the solution carrying fine $CaCO_3$ in suspension, coarse impurities or grit being separated out by the classifying action described above. The device will also clearly be useful in any wet classification as of ball mill discharge, to separate the ground product from oversize material or tailings.

While a specific embodiment of the invention has been particularly described and illustrated, it will be understood that such modifications and equivalents as may readily occur to persons skilled in the art are included within the scope of the invention which is limited only by the scope of the appended claims.

It is claimed and desired to secure by Letters Patent:

1. A material treating device of the type described comprising, a rotary drum, an annular decanting trough within said drum and positioned and supported at a spaced distance from the wall of said drum, and means for flowing liquids from said trough to the outside of said drum.

2. A material treating device of the type described comprising, a rotary drum, an annular decanting trough within said drum, means positioning and supporting said trough at a spaced distance from the wall of said drum, said supporting means including conduits for flowing liquids from said trough to the outside of said drum.

3. A material treating device comprising a drum mounted for rotation on a substantially horizontal axis, and an annular decanting trough within and intermediate the ends of said drum, positioned and supported at a spaced distance from the wall of said drum and discharging outwardly through the periphery of said drum.

4. A material treating device of the type described comprising, a rotary drum, an annular decanting trough within said drum, means positioning and supporting said decanting trough at a spaced distance from the wall of said drum, said positioning and supporting means including means for flowing liquids from said trough to the outside of said drum, agitating and conveying means in said drum for conveying coarse solids longitudinally of said drum and between said decanting trough and the inner surface of said drum and elevating and discharging said coarse solids independently of said liquids above a level substantially determined by the horizontal tangent to the lowest point of the opening of said decanting trough.

5. A decanting apparatus comprising a material treating drum rotating on a substantially horizontal axis and having inlet and discharge orifices in the ends thereof, a plurality of arcuately spaced radially arranged tubular members penetrating the peripheral wall of said drum intermediate said ends and having their inner ends equally spaced inwardly from said peripheral wall in a circle having a lower horizontal tangent than said inlet and discharge orifices, said tubular members forming a substantially constantly available outlet for gravity outflow of fluids from a predetermined level in said drum above said inner end of the lowest of said tubular members.

6. In a continuous material treating and classifying device comprising a drum rotating on a substantially horizontal axis, a trough within said drum spaced from the wall of said drum intermediate the ends thereof and having an inwardly facing annular decanting orifice concentric with said drum, a plurality of tubular supports for said trough, connected in fluid tight relation at their opposite ends to said drum and said trough at approximately equally spaced points about the peripheries of said drum and said trough, and orifices in said drum and said trough communicating with the interiors of said supports to provide for free flow of fluids from the interior of said trough outwardly through said supports to the exterior of said drum.

7. In a rotary lime slaker, an elongated drum rotating on a substantially horizontal axis and having feed and discharge openings in opposite ends thereof, means for feeding quick lime and water through said feed opening, decanting means within said drum and spaced at least in part in passage forming relation to the wall of said drum to provide for substantially unimpeded progress of material through said drum along the inner surface of the wall thereof, said decanting means having a decanting orifice spaced from the wall of said drum intermediate the ends thereof at a substantially constant level below the lowest point of said feed and discharge openings and providing a free gravity outlet for liquids such as the product known as milk of lime produced by the slaking process, and inwardly extending projections on the inner surface of said drum adapted to propel materials along the inner surface of the lower part of said drum past said decanting means below said decanting orifice and to elevate coarse granular solids and discharge the same through said discharge opening substantially free of liquids.

8. In a material treating device of the type described a rotary drum having a feed opening and an opening for discharge of granular solids at opposite ends thereof, liquid discharging means in said drum spaced at least in part from the wall of said drum and having a decanting lip in said drum spaced from the wall thereof longitudinally intermediate and below the level of said feed and discharge openings, said liquid discharging means being constructed and arranged in relation to the wall of said drum to provide passages for the passage of materials from the feed end along the inner surface of the lower part of said drum and past said liquid discharging means below the level of said decanting lip to the discharge end, and elevating means in the discharge end of said drum for elevating coarse granular solids to and discharging same through said discharge opening substantially free of liquids.

CLAIRE M. SHIGLEY.